(12) United States Patent
Betts

(10) Patent No.: US 6,310,700 B1
(45) Date of Patent: Oct. 30, 2001

(54) VELOCITY MATCHING ELECTRODE STRUCTURE FOR ELECTRO-OPTIC MODULATORS

(75) Inventor: Gary E. Betts, Westford, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/662,554

(22) Filed: Sep. 15, 2000

(51) Int. Cl.[7] ...................................................... G02B 6/36
(52) U.S. Cl. ........................................ 359/2; 385/1; 385/3
(58) Field of Search .................................. 385/1, 2, 3, 4, 385/8, 9, 14, 15, 16, 24, 27, 31, 39, 40, 41, 130, 131, 132; 333/33, 25, 206, 243, 244, 245; 359/245, 322, 295, 244

(56) References Cited

U.S. PATENT DOCUMENTS

| | | | |
|---|---|---|---|
| 4,005,927 | 2/1977 | Caton | 350/96 |
| 5,005,932 | 4/1991 | Schaffner et al. | 350/96.14 |
| 5,129,017 | 7/1992 | Kawano et al. | 385/3 |
| 5,220,627 | 6/1993 | Kawano et al. | 385/3 |
| 5,291,565 | 3/1994 | Schaffner et al. | 385/3 |
| 5,339,369 | 8/1994 | Hopfer et al. | 385/2 |
| 5,416,859 | 5/1995 | Burns et al. | 385/3 |
| 5,455,876 | 10/1995 | Hopfer et al. | 385/2 |
| 5,548,668 | 8/1996 | Schaffner | 385/1 |
| 5,563,965 | 10/1996 | Madabhushi | 385/2 |
| 5,619,607 | 4/1997 | Djupsjobacka | 385/129 |
| 6,198,855 * | 9/1999 | Hallemeier et al. | 385/2 |

OTHER PUBLICATIONS

Dagli, Nadir, "Wide–Bandwidth Lasers and Modulators for RF Photonics," *IEEE Transactions On Microwave Theory and Techniques*, 47(7): 1151–1171 (1999).

Walker, Robert G., "High–Speed III–V Semiconductor Intensity Modulators," *IEEE J. Quantum Electronics*, 27(3):654–667 (1991).

Wooten, Ed L., et al., "A Review of Lithium Niobate Modulators for Fiber–Optic Communications Systems," *IEEE J. Selected Topics In Quantum Electronics*, 6(1): 69–82 (2000).

Proposal Abstract for "Low VII Electro–Optic Devices", by Electro–Optical Materials and Devices Group, Lincoln Laboratory, MIT, Aug. 6, 1999.

* cited by examiner

*Primary Examiner*—Georgia Epps
*Assistant Examiner*—Tuyen Tra
(74) *Attorney, Agent, or Firm*—Hamilton, Brook, Smith, Reynolds, P.C.

(57) ABSTRACT

This is an electro-optic modulator having an electro-optic substrate such as lithium niobate, an optical waveguide defined within the substrate, an electrode structure including a microwave transmission line elevated from the substrate by conductive legs. In one embodiment, a low-dielectric constant buffer layer is disposed between the substrate and the transmission line. The conductive legs extend from the transmission line to a surface of the substrate toward the waveguide, through the buffer layer. The microwave transmission line is elevated from the substrate at a distance such that the electrical propagation velocity is at a maximum. The high electrical velocity is offset by a loading capacitance introduced by the conductive legs which slows the electrical velocity down on the transmission line to match the optical velocity. Pairs of opposing conductive legs provide a strong electric field for modulating the optical signal.

28 Claims, 12 Drawing Sheets

VELOCITY MATCHING ELECTRODE STRUCTURE FOR ELECTRO-OPTIC MODULATORS

GOVERNMENT SUPPORT

The invention was supported, in whole or in part, by a grant F19628-95-C-0002 from United States Air Force. The Government has certain rights in the invention.

BACKGROUND OF THE INVENTION

Electro-optic modulators are used in fiberoptic communication systems, in particular, commercial long distance, high speed digital communication systems. Electro-optic modulators convert electrical signals into modulated optical signals. The electrical signals represent the data or voice for transmission over the fiberoptic communication system. The modulated optical signal is the data/voice transmission in an optical waveform.

Techniques for modulating an optical signal include amplitude modulation and phase modulation. Amplitude modulation results in the modulated optical signal or light emitted from the modulator being switched from on to off. A Mach-Zehnder interferometer is an example of a modulator performing amplitude modulation. Phase modulation results in the phase of the optical signal being shifted a certain number of degrees. Phase modulated signals require specialized wave detectors to detect the change in phase, while amplitude modulated signals can be detected by photon detectors that detect the power of the received signal in terms of photons.

The typical structure of an electro-optic modulator includes an electro-optic substrate, such as lithium niobate or III–V semi-conductors, an optical waveguide pattern defined within the substrate, and an electrode structure disposed over the substrate carrying the electrical signals to be converted.

As electrical signals propagate through the electrode structure, an electric field is generated across a length of the waveguide, known as the interaction distance. The application of the electric field across the waveguide for the entire length of the interaction distance affects the refractive index of the electro-optic substrate causing an optical signal (i.e. light) propagating through the waveguide to be modulated.

The electrode structure disposed over the substrate provides a strong electrical-optical interaction. The interaction strength is characterized by a "VL product," which is the product of a switching voltage ($V_\pi$) of the electrical signal multiplied by the interaction distance (L) (i.e. V×L). The switching voltage, $V_\pi$, is the voltage swing required at the modulator electrical input to cause the light being emitted from the modulator either to go from "on" to "off" or to shift its phase a certain amount. This interaction strength is generally a constant, typically 55 volts per millimeter (V-mm) at 1550 nanometers (nm) for lithium niobate.

The present limiting factor of electro-optic modulators is the high drive voltage requirement suitable for transmitting at data rates of 10 gigabits per second (Gbit/s) and above. According to the VL product, the required switching voltage can be lowered if the modulator's interaction distance is increased such that the electric field is applied to the optical signal over a maximum length. However, long modulators require the velocities of the electrical and optical signals to be matched in order to apply the electric field to the optical signal for the entire length of the interaction distance. If not, the electric field would not be applied to the optical signal for the entire length of the interaction distance degrading the modulation.

There are a variety of electrode designs in existence today that achieve the necessary velocity match. All of them make some compromise among velocity, electrical/optical overlap (a measure of modulation efficiency), impedance, microwave loss, and manufacturability. Combined with modulator substrate materials, primarily lithium niobate and III–V semi-conductors, state of the art modulator performance is barely adequate for 10 Gbit/s systems and is inadequate at higher speeds, such as 40 Gbit/s.

A known electrode design for velocity matching is the capacitive loading of a transmission line. The effect of this design is to slow down the velocity of the electrical signal relative to its velocity on the unloaded transmission line, and to lower the impedance below that of the unloaded line. This is an advantage in modulator designs where the electrical velocity on the unloaded line is faster than the velocity of light in the waveguides, such as modulator designs based on III–V semiconductor electro-optic substrates.

However, the slowing effect of this electrode design renders this type of electrode useless for modulators where the velocity of the electrical signal is already slower than the optical velocity, such as modulator designs based on lithium niobate electro-optic substrates.

SUMMARY OF THE INVENTION

According to one embodiment, the electro-optic modulator includes an electro-optic substrate, at least one optical waveguide defined within the substrate having an optical signal propagating at an optical velocity; and an electrode structure having a transmission line and conductive legs. The conductive legs extend the transmission line from the substrate, while an electrical signal propagates at an electrical velocity along the transmission line. According to a further embodiment, the electro-optic modulator may include a dielectric layer disposed between the substrate and the transmission line. The dielectric layer has a dielectric constant lower than the substrate, as in the embodiment where the dielectric layer is made of polyimide.

According to an embodiment, the conductive legs extend the transmission line a distance from a surface of the substrate substantially reducing the strength of an electric field, associated with the electrical signal propagating in the transmission line, in the substrate to maximize the electrical velocity of the electrical signal propagating on the transmission line. The electric field associated with the electrical signal propagating in the transmission line substantially travels within a region having a dielectric constant lower than a dielectric constant of the substrate. The region having a low dielectric constant may be air or a dielectric layer.

The conductive legs provide a capacitance reducing the electrical velocity to match the optical velocity of the optical signal propagating in the waveguide. According to one embodiment, the electro-optic modulator includes a first set of conductive legs opposing a second set of conductive legs along a length of the optical waveguide generating an electric field across the waveguide modulating the optical signal. The conductive legs may be spaced apart from one another.

According to an embodiment, the conductive legs include a low reactance electrical conductor and a loading electrode. Opposing loading electrodes of opposing conductive legs are disposed along a length of the optical waveguide generating an electric field across the waveguide modulating the optical signal. The opposing loading electrodes of the opposing conductive legs generate a capacitance that reduces the electrical velocity on the transmission line to match the optical velocity of the optical signal.

According to one embodiment, the optical waveguide is aligned between opposing loading electrodes of the conductive legs such that the optical signal may be modulated by a horizontal component of the electric field. According to an alternative embodiment, the optical waveguide is aligned adjacent to the loading electrodes such that the optical signal may be modulated by a vertical component of the electric field.

The electro-optic substrate can be modified according to several different embodiments. The electro-optic substrate may be a thin layer disposed over a second substrate having a lower dielectric constant at electrical frequencies. The substrate may be non-planar in which the optical waveguide is ridged. The substrate may be a ferroelectric material, such as lithium niobate, or a III–V semiconductor material.

According to another embodiment, the electro-optic modulator includes an electro-optic substrate, at least one optical waveguide defined within the substrate having an optical signal propagating at an optical velocity, and an electrode structure having a transmission line and conductive legs. The transmission line has a signal electrode and at least one ground electrode. The conductive legs may extend the transmission line from the substrate, while an electrical signal propagating at an electrical velocity along the transmission line is substantially matched with the optical velocity. Furthermore, a dielectric layer is disposed adjacent the signal electrode and the ground electrode with the dielectric layer having a dielectric constant lower than the substrate.

According to a further embodiment, an electro-optic modulator includes an electro-optic substrate, at least one optical waveguide defined within the substrate having an optical signal propagating at an optical velocity, and an electrode structure having a transmission line and conductive legs. The transmission line has a signal electrode and at least one ground electrode with the conductive legs extending the signal electrode from the substrate. The ground electrode may be disposed directly over a surface of the substrate. The electrical velocity of the electrical signal propagating along the transmission line is substantially matched with the optical velocity. Furthermore, a dielectric layer is disposed adjacent the signal electrode with the dielectric layer having a dielectric constant lower than the substrate.

According to still another embodiment, an electro-optic modulator includes an electro-optic substrate, at least one optical waveguide defined within the substrate having an optical signal propagating at an optical velocity, and an electrode structure having an microstrip transmission line and conductive legs. The microstrip transmission line may have a signal electrode and a ground electrode with the signal electrode having arms extending substantially perpendicular from it. The conductive legs extend from the arms of the signal electrode to a surface of the substrate toward the waveguide, while the ground electrode may be disposed directly over a surface of the substrate. The electrical velocity of the electrical signal propagating along the transmission line is substantially matched with the optical velocity. An further alternative embodiment includes a dielectric layer disposed between the signal electrode and the ground electrode with the conductive legs extending from the arms of the signal electrode to the surface of the substrate through the dielectric layer toward the waveguide. The dielectric layer has a dielectric constant lower than the substrate.

According to still another embodiment, the electro-optic modulator further includes an isolation buffer layer disposed immediately over the electro-optic substrate. Embodiments of the invention maybe applied to a variety of modulators such as a Mach-Zehnder interferometer, a phase modulator, or a cutoff modulator.

According to still another embodiment, an electro-optic modulator includes an electro-optic substrate, at least one optical waveguide within the substrate for supporting an optical signal at an optical velocity, an electrode structure forming a transmission line, and conductive legs extending from the transmission line which can support an electrical signal propagating at an electrical velocity along the transmission line substantially matching the optical velocity.

Figure 1:
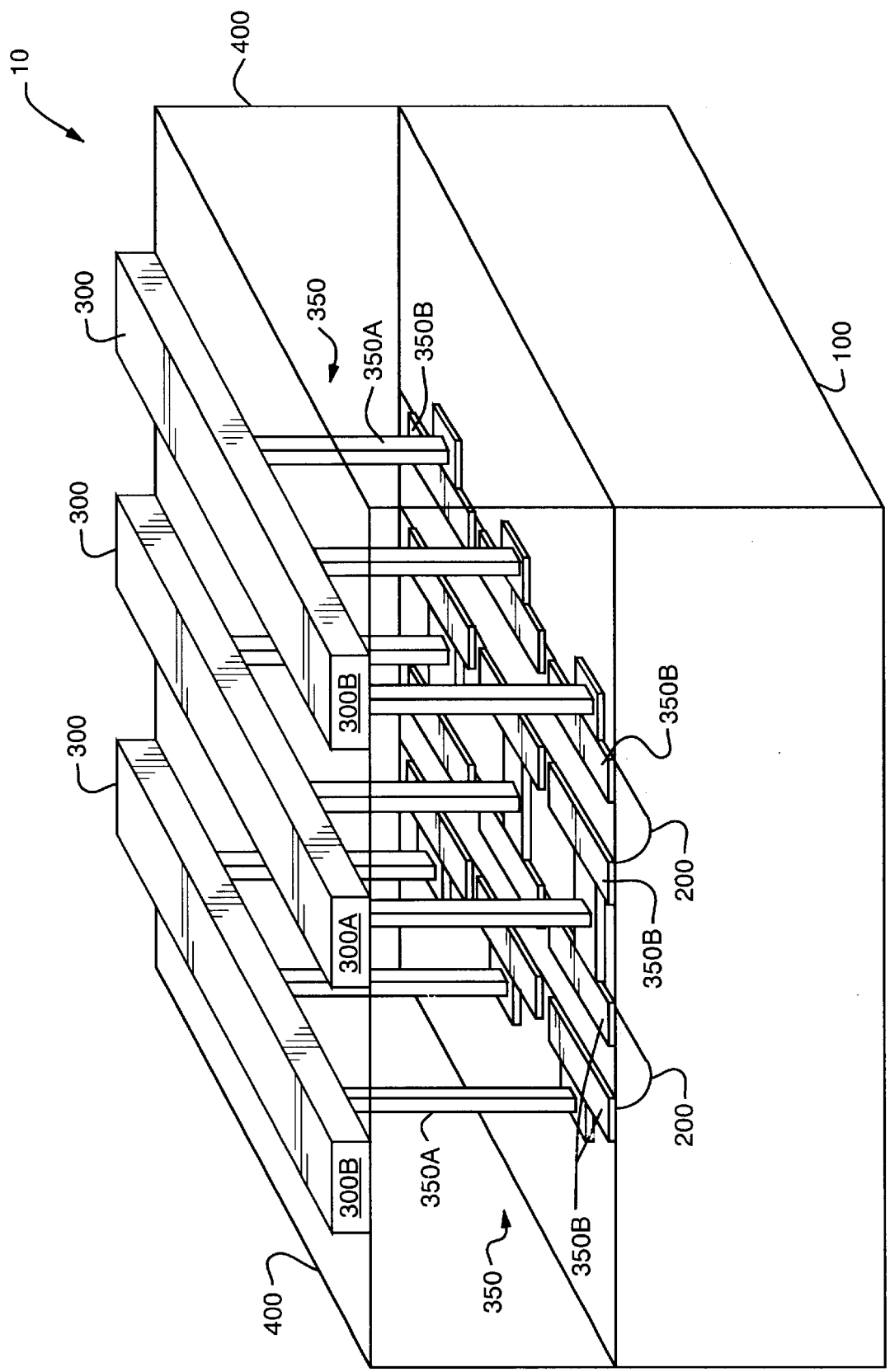
FIG. 1 is a three-dimensional, cross-sectional view of the two-arm region of a Mach-Zehnder interferometer, a high speed electro-optic modulator, according to one embodiment.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

In general, electro-optic substrates have different dielectric constants at electrical and optical frequencies. The greater the dielectric constant at a certain frequency, the slower the propagation velocity of a signal at that frequency. In a typical electro-optic modulator, the optical waveguide is completely buried in an electro-optic substrate, such as lithium niobate or a III–V semiconductor. The velocity (v) of the optical signal propagating in the waveguide is calculated by the speed of light in a vacuum (c) divided by the square root of the dielectric constant (k) of the substrate at an optical frequency.

$$v = \frac{c}{\sqrt{k}} \quad (1)$$

The velocity of the electrical signal on the unloaded transmission line is calculated by the same equation where c is the speed of the electrical signal in a vacuum. However, since an electrical signal propagating through a transmission line has part of its electric field in the electro-optic substrate and part in the other layers surrounding the transmission line (i.e., air), the electrical velocity depends on a combination of the various dielectric constants.

Lithium niobate is a ferroelectric material. With respect to lithium niobate substrates, its dielectric constant of 35 at electrical microwave frequencies is much larger than at optical frequencies. Therefore, light travels faster in the optical waveguide than the electrical signal over the transmission line. Typically, the velocity of the optical signal in lithium niobate is approximately half the speed of light in a vacuum while the electrical signal velocity is approximately a quarter the speed of light (i.e., optical velocity is twice as fast as electrical velocity).

Prior art approaches to velocity matching with lithium niobate substrates have kept the transmission line continuous along the modulator, but have designed its cross-section thicker such that more of the electric field travels in regions having a low-dielectric constant, such as air having a dielectric constant of 1. The electrical velocity on the transmission line is thus increased, because less of the electric field is traveling through the high dielectric substrate. This accomplishes the required velocity matching enabling a modulator to have a long length (e.g typically 40 mm). However, this approach also reduces the electric field across the optical waveguide raising the VL product such that the benefit of the longer length is partially offset by the cost of the lower interaction strength. Such reported modulators achieve about 6V switching voltage at 32 GHz.

A known method of velocity matching is the capacitive loading of a transmission line using a loaded line electrode structure. Capacitive loading of a transmission line is typically effective in velocity matching where the velocity of the electrical signal on an unloaded microwave transmission line is faster than the optical velocity in a waveguide, such as in III–V semiconductor modulators. With III–V semiconductor substrates, the electrical velocity without capacitive loading is approximately half the speed of light, while the optical velocity is slower at one-third the speed of light. The effect of the loaded line electrode structure is to add capacitance to the electrical transmission line in order to slow down the electrical propagation velocity such that it approximately matches the optical propagation velocity. Since the electrical propagation velocity on a transmission line can also be calculated by the inverse of the square root of inductance (L) multiplied by capacitance (C), the additional capacitance decreases the electrical velocity.

$$v = \frac{1}{\sqrt{LC}} \quad (2)$$

In equation (2), C is the total capacitance, C=Cu+Cload, where Cu is the capacitance of the unloaded transmission line and Cload is the capacitance of the loading electrodes. The impedance Z of a transmission line is given by $$Z = \sqrt{\frac{L}{C}} \quad (3)$$

The impedance is constrained in many applications by the requirement that the transmission line impedance match a given drive amplifier impedance. In cases where it is not constrained by an impedance-matching requirement, it is still desirable for Z not to be too small because higher impedance means higher voltage for a given drive power, and electro-optic modulators respond to the voltage. In other words, the impedance Z is not a free parameter. It is more properly taken as an input condition to the problem of modulator design. Therefore, the transmission line equations (1) through (3) can be combined to give $$Cload = \frac{n_o^2 - n_u^2}{Cn_o} \frac{1}{Z} \quad (4)$$

in the case where the loaded line's microwave velocity matches the optical velocity. In equation (4), $n_o$ is the optical refractive index which is used to calculate the optical velocity (i.e. optical velocity is approximately equal to speed of light in a vacuum (c) divided by $n_o$). Similarly, the microwave index of the unloaded transmission line ($n_u$) is approximately equal to the square root of the dielectric constant, k, and is used to calculate the microwave velocity on unloaded line (i.e., electrical velocity is approximately equal to the speed of the electrical signal in a vacuum (c) divided by $n_u$).

Factors that improve the modulator efficiency such as small electrode gaps, large fraction of the available interaction length covered by electrodes, and placement of electrodes so their field is concentrated in materials of high dielectric constant, all increase the electrode capacitance. Therefore, a good modulator design requires a high Cload. By examining equation (4) it is clear that the smaller $n_u$ can be made, the larger Cload is allowed.

Prior art approaches to loaded-line modulators simply placed the unloaded line on the electro-optic substrate, perhaps with a thin isolation buffer layer, so that the unloaded line velocity was substantially determined by the electro-optic material as the transmission line substrate. For a substrate such as lithium niobate, capacitive loading (e.g. a loaded line) using prior art techniques would not even be possible because $n_u$ would be larger than $n_o$. Embodiments of this invention make a loaded line possible by reducing $n_u$ substantially below $n_o$. Embodiments of this invention are also applicable to a wide range of materials. For a substrate such as III–V semiconductor, where $n_u$ is smaller than $n_o$ even with prior art techniques, embodiments of this invention provide a method for reducing $n_u$ further, leading to a larger loading capacitance which in turn gives a lower-voltage modulator.

The embodiments of the invention that are described herein facilitate the reduction of the unloaded line index $n_u$ thereby increasing the velocity on the unloaded line.

FIG. 1 is a three-dimensional, cross-sectional view of a Mach-Zehnder interferometer, a high speed electro-optic modulator, according to one embodiment. The Mach-Zehnder interferometer is used for analog and digital transmissions. Although the Mach-Zehnder interferometer is used for purposes of illustration, other modulators can be modified according to the principles of the invention as well.

In brief overview the present invention involves an electro-optic modulator 10 having an electro-optic substrate 100, an optical waveguide 200 defined within the substrate 100, an electrode structure including a microwave transmission line 300 elevated from the substrate 100 by conductive legs 350, and a buffer layer 400 disposed between the substrate 100 and the transmission line 300. While the term "elevated" is used herein for convenience it is clear that the transmission line 300 could also be depressed or lowered below the substrate an equal distance. The conductive legs 350 extend from the transmission line 300 to a surface of the substrate 100 toward the waveguide 200, through the buffer layer 400.

In some embodiments the conductive legs 350 can support the transmission line 300, such that no supporting buffer layer 400 need be present. The transmission line is most easily supported by a thick layer of low-dielectric-constant material such as polyimide, but in some cases it can be supported by the conductive legs themselves so that the dielectric material between the transmission line and the electro-optic substrate is air.

The microwave transmission line 300 is elevated from the substrate 100 at a distance such that the electrical propagation velocity is at a maximum. This is accomplished by separating the unloaded transmission line from the electro-optic material by a significant distance as compared to the transmission line dimensions, so that the unloaded line velocity is determined by the low-dielectric-constant materials surrounding it. In particular, the conductive legs 350 must be long enough to elevate the transmission line 300 away from the substrate 100 such that the stronger parts of the electric field generated by the electrical signals propagating in the transmission line 300 (hereinafter the "electric field of propagation 710") does not reach the lithium niobate substrate 100 slowing down the electrical velocity. The electric field of propagation 710 (shown in FIG. 3) is generated across the gaps between the electrodes of the transmission line 300, but does not perform the modulation of the optical signals. The high electrical velocity is then offset by a loading capacitance introduced by the conductive legs 350 which slows the electrical velocity down on the transmission line 300 to match the optical velocity.

Pairs of opposing conductive legs provide a strong electric field for modulating the optical signals (hereinafter the "electric field for modulation 700").

The buffer layer 400, when present, is made of a material having a low-dielectric constant where low is defined as lower than the dielectric constant of the electro-optic material of the substrate 100, such as lithium niobate. The thickness of the buffer layer 400 is approximately the same as the height of the conductive legs 350 which is about 10 microns or greater. Since a portion of the electric field of propagation 710 is traveling in the low-dielectric buffer layer 400 rather than in the electro-optic substrate 100, the electrical velocity of the transmission is increased.

Figure 2:
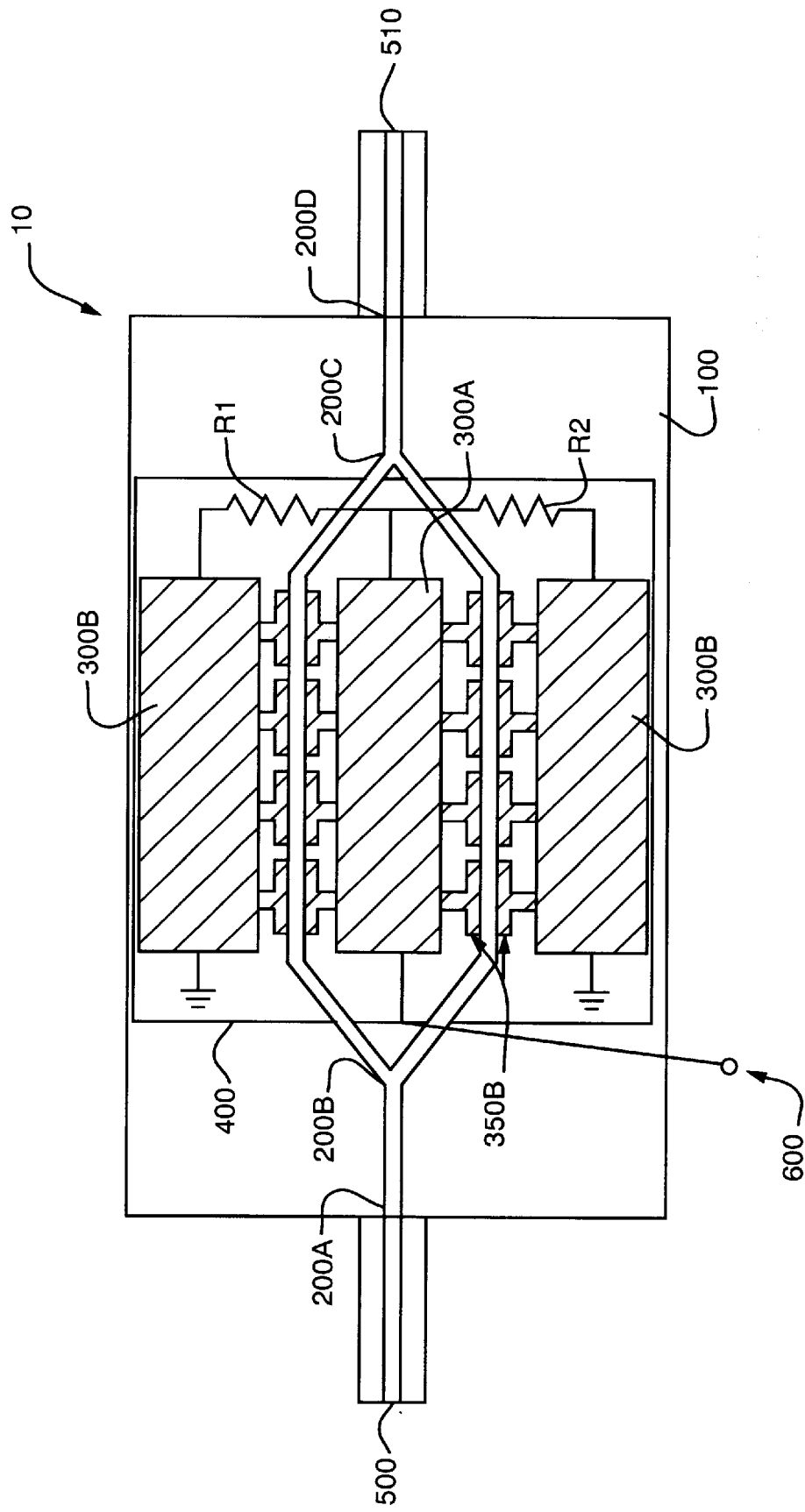
FIG. 2 is a top view of a Mach-Zehnder interferometer according to one embodiment.

In more detail, FIG. 2 is a top view of a Mach-Zehnder interferometer according to one embodiment. The Mach-Zehnder interferometer 10 includes an electro-optic substrate 100 having an optical waveguide 200 defined co-planar with the surface of the substrate 100. The optical waveguide 200 diverges into two separate waveguide paths or arms at 200B reconnecting at 200C. The optical signal enters the waveguide 200 at 200A from an input optical fiber 500. The source of the optical signal may be a laser or any other appropriate light source known to those skilled in the art. The optical signal, propagating along the optical waveguide 200 at an optical velocity, is split between the two arms of the waveguide at 200B. The optical signals in both arms recombine at 200C. The modulated optical signal exits the modulator at 200D into an output optical fiber 510.

The loaded line electrode structure also provides the electric field for modulating the optical signal (hereinafter the "electric field for modulation 700") in addition to the loading capacitance for slowing down the electrical velocity to match the optical velocity. The loaded line electrode structure has two parts, an unloaded microwave transmission line 300 and conductive legs 350.

The unloaded microwave transmission line 300 is continuous in the sense that an electrical signal can propagate along the line at all frequencies of interest (e.g., DC to 32 GHz). According to one embodiment, the unloaded microwave transmission line 300 includes a signal electrode 300A and two ground electrodes 300B. The signal electrode 300A and ground electrodes 300B are disposed above the substrate 100 over the buffer layer 400 in a co-planar arrangement substantially parallel to the propagation of the optical signal over a portion of the waveguide 200. The unloaded transmission line 300 is physically large to minimize signal loss, particularly at high electrical frequencies. The electric field of propagation 710 is generated across the gaps between the signal electrode 300A and the ground electrodes 300B, but does not perform modulation.

Resistors R1 and R2 are located between the signal electrode 300A and the ground electrodes 300B. These resistors provide a termination impedance to prevent corruption of the electrical signals due to reflection of energy.

Conductive legs 350 include a low reactance electrical conductor 350A (not shown in FIG. 2) and a loading, or modulating, electrode 350B. Loading capacitors are formed by opposing loading electrodes 350B where one electrode is connected to the signal electrode 300A and the other is connected to a ground electrode 300B via an electrical conductor 350A. The opposing loading electrodes 350B may be placed periodically or in an aperiodic pattern along any fraction of the total length of the arms of the optical waveguide 200. These discrete loading capacitors are isolated from one another such that an electrical signal cannot propagate with low loss from one to another by a path other than the unloaded transmission line 300. The added capacitive load causes the electrical velocity that was increased due to the elevation of the transmission line 300 to be slowed down such that the velocities of the optical and electrical signals are matched.

Modulation is accomplished by the loading electrodes 350B. The electric field for modulation 700 is generated across the gaps between opposing loading electrodes 350B of the loading capacitors such that it is applied across the optical waveguide 200. As long as spacing between the loading capacitors is small as compared with the wave length of the electrical signal, the electric field for modulation 700 is uniformly and continuously applied across the waveguide 200. By creating a small gap between opposing loading electrodes 350B, the electric field for modulation 700 for a given voltage can be made very large; thus, decreasing the high voltage requirement.

A signal generator generates the electrical signal that enters the electrical data input 600 and propagates through the signal electrode 300A at an electrical velocity. As the electrical signal propagates down the transmission line 300, charge is transferred on and off the loading electrodes 350B of the conductive legs 350 causing the time-varying electric field for modulation 700 to be applied across the arms of the optical waveguide 200.

In general, the application of the electric field for modulation 700 changes the refractive index of the electro-optic substrate 100 causing a slight phase shift in the optical signal in the waveguide 200. For instance, with respect to the Mach-Zehnder interferometer 10 performing amplitude modulation, the optical signal or light is split between each arm of the waveguide 200 such that each arm has half of the power of the original signal and the optical signals are in phase. A certain voltage, $V_\pi$, of the electrical signal input at data input 600 generates an electric field for modulation 700. When the electric field 700 is applied across the waveguide 200 for the entire length of the interaction distance, the two optical signals propagating in the arms of the waveguide 200 become out of phase by a 180 degree phase shift. Thus, the modulated optical signals effectively cancel each other out to zero when they recombine at 200C resulting in no light being output from the modulator 10. Conversely, when no electric field is applied across the waveguide 200 (e.g., when the voltage of the electrical signal with respect to ground is zero volts), there is no modulation of the optical signals. Therefore, the signals recombine in phase at 200C such that the optical signal (i.e., light) exits the modulator 10.

Figure 3:
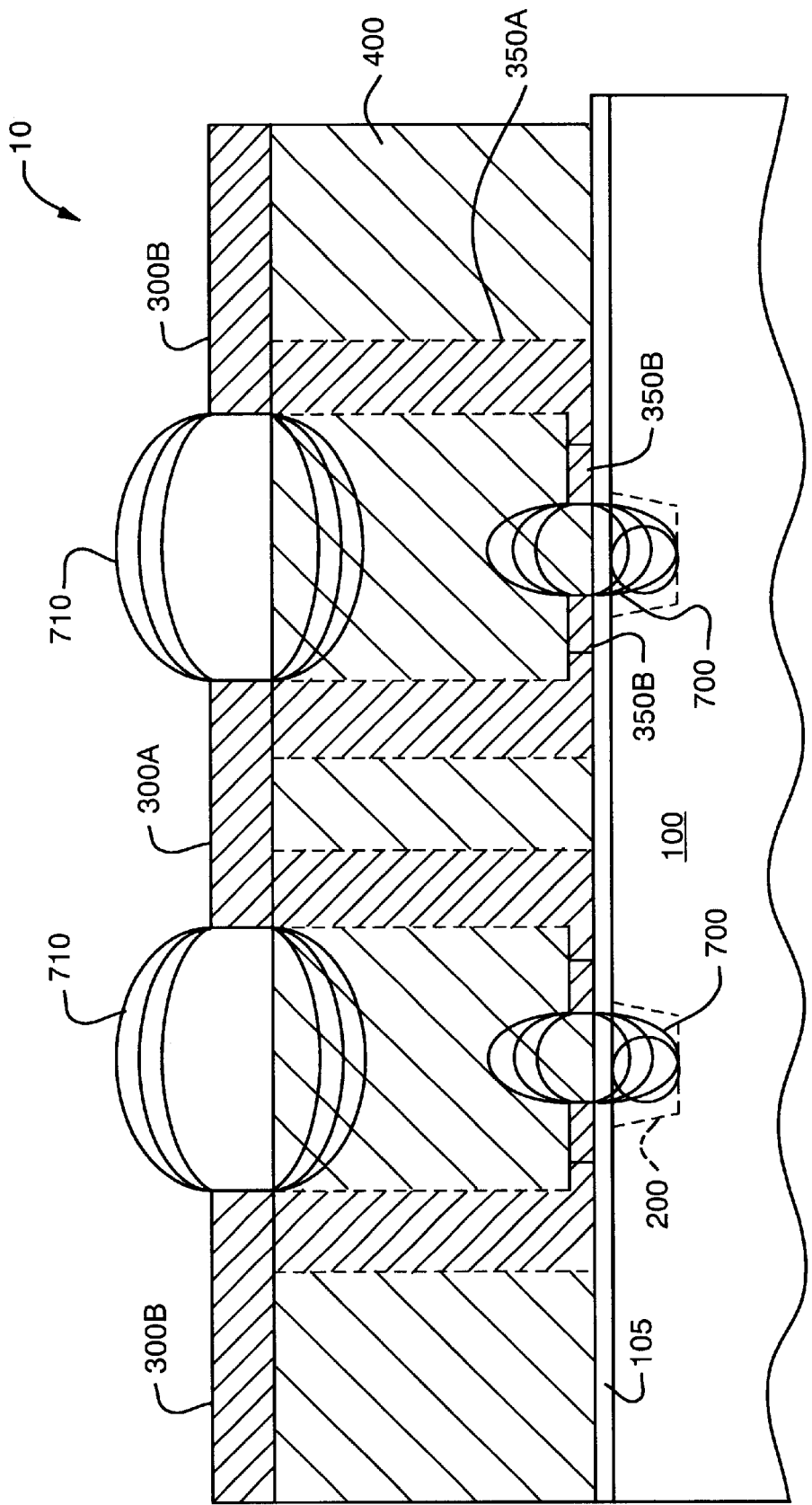
FIG. 3 is a cross-sectional view of the two-arm region of a Mach-Zehnder interferometer according to one embodiment.

FIG. 3 is a cross-sectional view of the Mach-Zehnder interferometer according to one embodiment. The conductive legs 350 include a low reactance electrical conductor 350A, such as a metal stripe, connecting the loading electrodes 350B to the transmission line 300. In one embodiment, the electrical conductors 350A of conductive legs 350 extend from the signal electrode 300A and ground electrodes 300B of the microwave transmission line 300 through holes in the buffer layer 400. These holes are fabricated through photolithography and an etching process. The conductive legs 350 may be made of a low-reactance metal, such as gold. The loading electrodes 350B of the conductive legs 350 connected to the electrical conductors 350A are disposed between the buffer layer 400 and either the electro-optic substrate 100 or isolation buffer layer 105. Opposing loading electrodes 350B are aligned on both sides of both arms of the waveguide 200.

According to this embodiment, the optical waveguide 200 is aligned between the loading electrodes 350B of the conductive legs 350 within the substrate 100. With x-cut lithium niobate, this alignment facilitates the use of the horizontal component of the electric field for modulation 700.

The electro-optic substrate 100 is covered with a thin isolation buffer layer 105 separating the loading electrodes 350B from the optical waveguide 200. The isolation buffer layer 105 may be a layer of silicon dioxide ($SiO_2$) or some other suitable material that has the property of preventing the light in the optical waveguides from being absorbed by the loaded line electrode structure. In an alternative embodiment, the isolation buffer layer 105 may be omitted.

The buffer layer 400 is shown as being disposed over a substantial area of the surface of the substrate 100. The buffer layer 400 is made of a material having a low-dielectric constant where low is defined as lower than the dielectric constant of the electro-optic material of the substrate 100, such as lithium niobate. A suitable material for the buffer layer 400 is polyimide, whose dielectric constant of 3 is low enough to make this design practical on lithium niobate.

According to the embodiment as shown, the signal electrode 300A and the ground electrodes 300B of the microwave transmission line 300 are all disposed on the surface of the buffer layer 400. The thickness of the buffer layer 400 should be thick enough such that the electric field 710 generated by the electrical signals propagating in the transmission line 300 does not reach the lithium niobate substrate slowing down the electrical velocity. In one embodiment, the buffer layer 400 can be fabricated in layers of 10 microns thickness or greater, preferably 40 to 80 microns thickness in the case where the substrate is lithium niobate.

Furthermore, this loaded line electrode structure is advantageous with modulators having III–V semiconductor substrates as well. As previously discussed, the electrical velocity is already faster than the optical velocity with modulators having a III–V semiconductor substrates. By elevating the transmission line 300 away from a III–V semiconductor substrate, the electrical velocity, which is already faster than the optical velocity, is further increased. However, the extra velocity allows for the addition of more loading capacitance facilitating modulators with smaller dimensions. For instance, more capacitance can be achieved by shrinking the gap between the opposing loading electrodes 350B of the conductive legs 350. A smaller gap between loading electrodes 350B corresponds to a higher electric field 700 at a lower switching voltage. Thus, even electro-optic modulators having substrates such as III–V semiconductors can benefit from this improved design.

Figure 4:
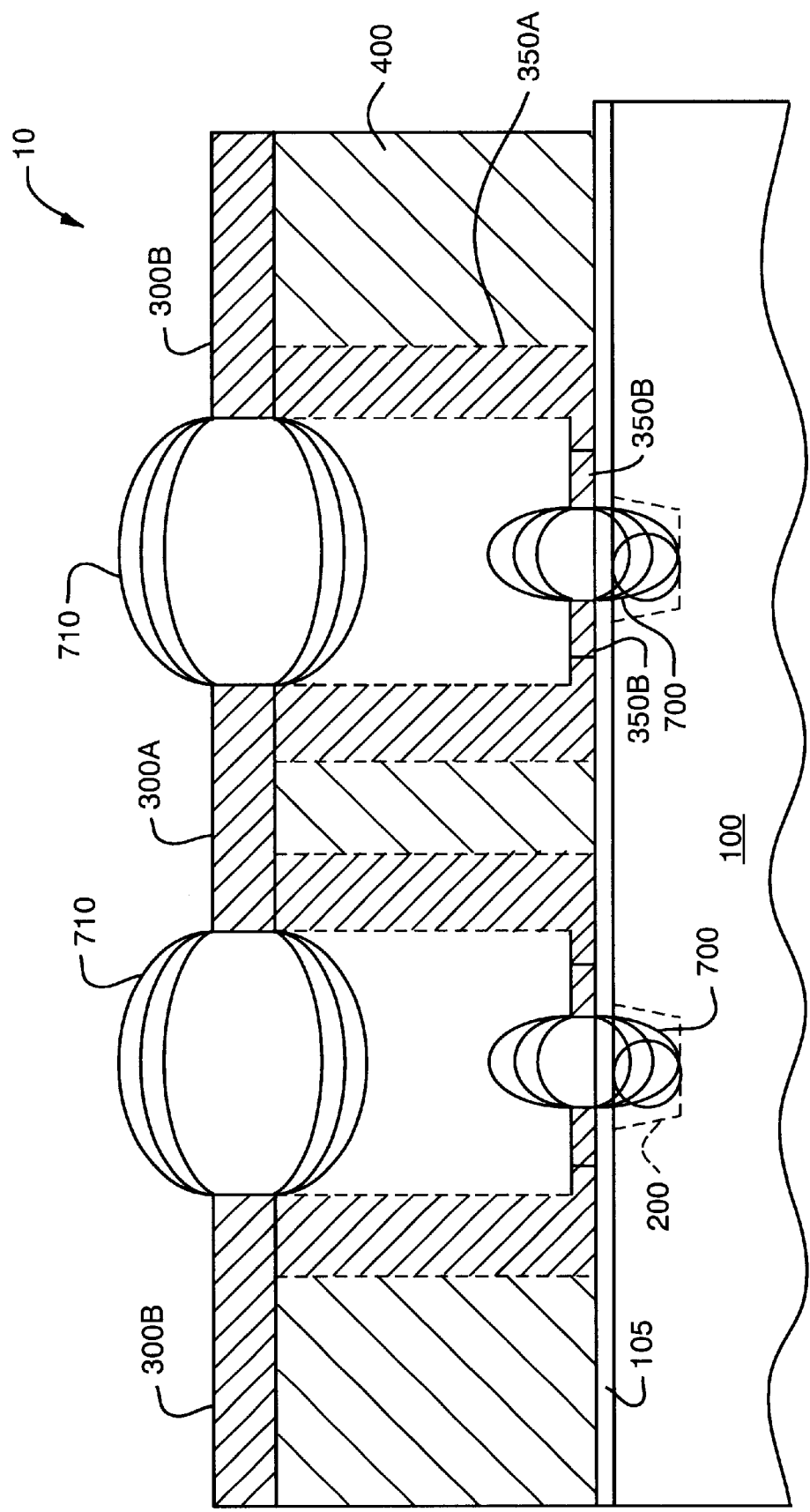
FIG. 4 is a cross-sectional view of a Mach-Zehnder interferometer with an etched buffer layer according to an alternative embodiment.

FIG. 4 is a cross-sectional view of a Mach-Zehnder interferometer with an etched buffer layer according to an alternative embodiment. Since air has a lower dielectric constant than a buffer layer 400 of polyimide, the electrical velocity of the transmission line 300 is further increased by removing portions of the buffer layer 400 that are not needed to support the transmission line 300. As shown in FIG. 4, portions of the buffer layer 400 are removed from the volumes defined substantially between the signal and ground electrodes, 300A and 300B respectively, and the conductive legs 350. An anisotrophic etching method, such as reactive ion etching, could be used with the transmission line electrode as a self-aligned mask to accomplish this.

The remaining portions of the buffer layer 400 are disposed underneath the signal and ground electrodes 300A and 300B of the transmission line 300. Therefore, the electrical signal propagating in the transmission line 300 has a substantial part of its electric field 710 in the air which has a dielectric constant of 1. Thus, the electrical propagation velocity is further increased. As with III–V semiconductors, the extra velocity allows more loading capacitance facilitating the design of electro-optic modulators with smaller dimensions and stronger electric fields at lower switching voltages. If the spacing between loading capacitors is small enough so that the conductive legs 350 can support the transmission line, an isotropic etch (such as wet chemical etch) can be used to completely remove the buffer, leaving the transmission line completely surrounded by air.

Figure 5:
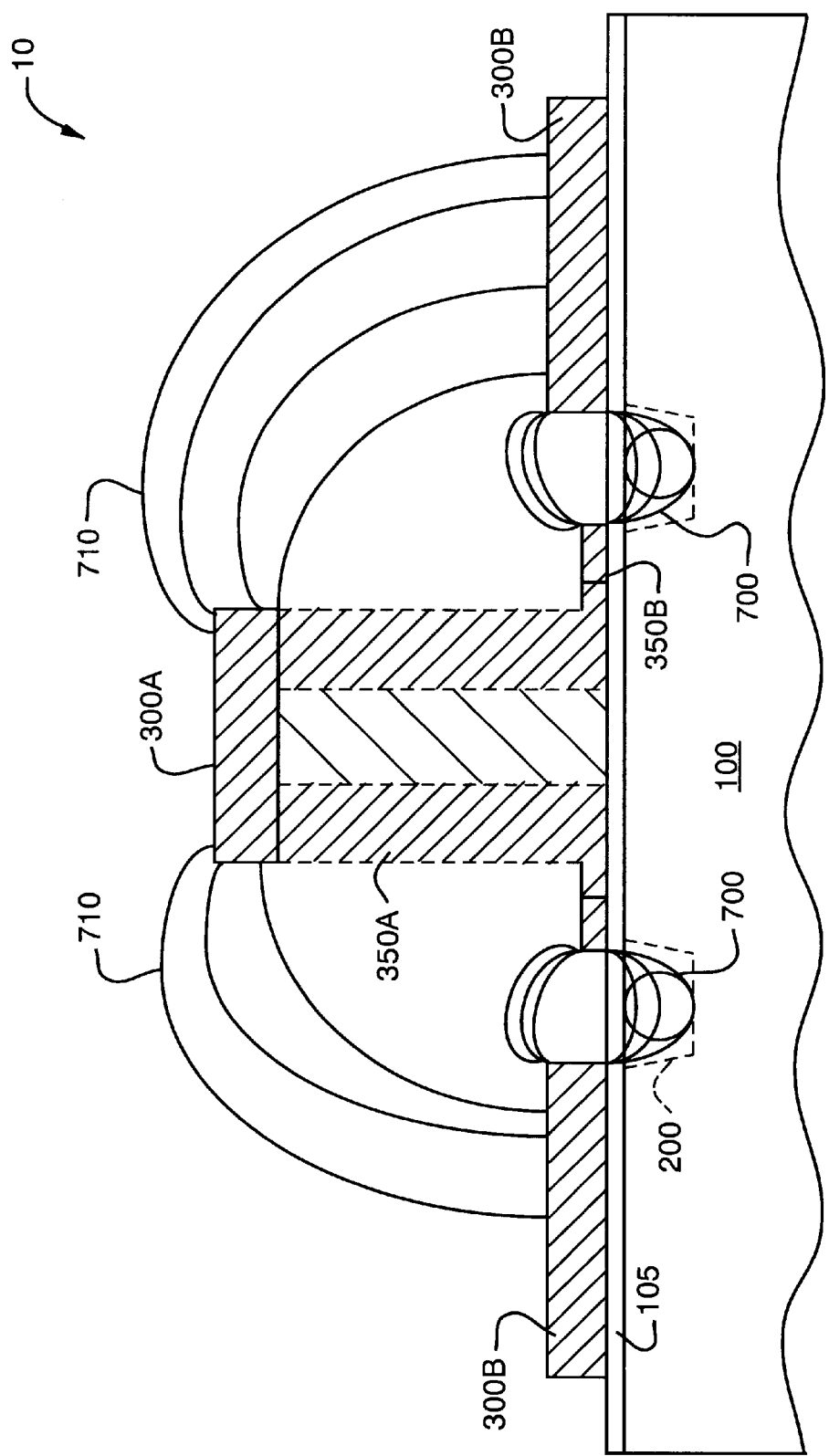
FIG. 5 is cross-sectional view of the Mach-Zehnder interferometer having a ground electrode structure according to an alternative embodiment.

FIG. 5 is cross-sectional view of the Mach-Zehnder interferometer having a ground electrode structure according to an alternative embodiment. As in FIG. 4, the buffer layer 400 is etched away in order for more of the electric field 710 to travel in the region of the air having a low-dielectric constant further increasing the electrical propagation velocity. As shown, the remaining portion of the buffer layer 400 is disposed substantially in the volume underneath the signal electrode 300A which is elevated from the electro-optic substrate 100.

However, in this arrangement, ground electrodes 300B are used for modulating the optical signals in addition to being ground for the transmission line 300. Ground electrodes 300B are continuous and are disposed directly over the surface of the isolation buffer layer 105 or substrate 100 if isolation buffer layer 105 is omitted. Although there are no conductive legs 350 having loading electrodes 350B connected to the ground electrodes 300B, the segmented center electrode formed by the conductive legs 350 and signal electrode 300A ensures that the microwave power flows only on the transmission line 300. The electric field 700 for modulating the optical signal is applied across the gap between the conductive legs 350 and the ground electrodes 300B.

Figure 6A:
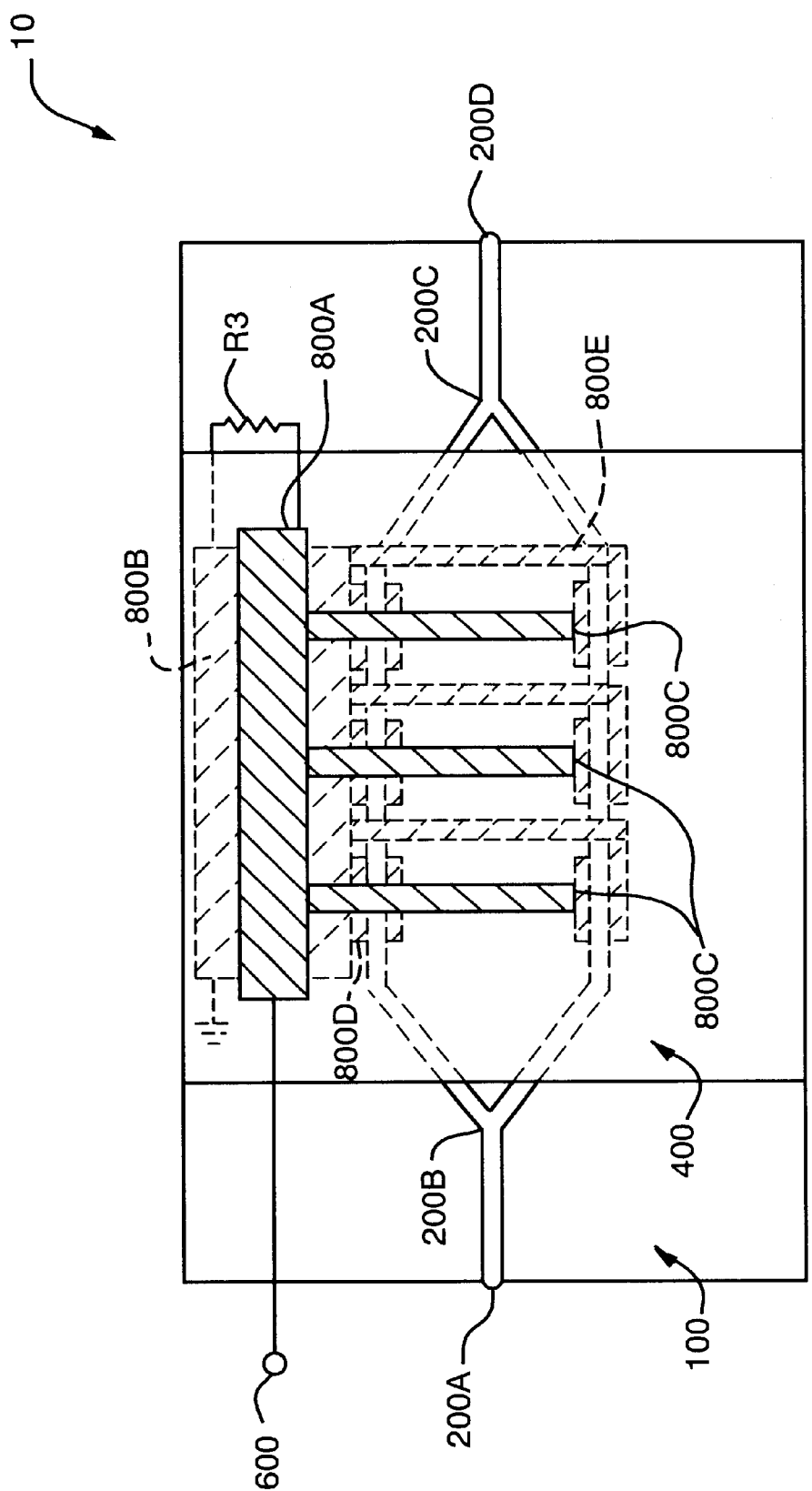
FIG. 6A is a top view of a Mach-Zehnder interferometer having a microstrip transmission line according to an alternative embodiment.

FIG. 6A is a top view of a Mach-Zehnder interferometer having a microstrip transmission line according to an alternative embodiment. A low-dielectric constant buffer layer 400 is disposed over the electro-optic substrate 100. The substrate 100 has an optical waveguide 200 defined within it as shown in previous embodiments.

The microstrip transmission line 800 includes a signal electrode 800A and a ground electrode 800B interconnected via a resistor R3. The signal electrode 800A is disposed on the top surface of the buffer layer 400 substantially parallel to the propagation of the optical signal. Arms 800C extend perpendicular from the signal electrode 800A across the top surface of the buffer layer 400 over a portion of the optical waveguide 200. Arms 800C of the signal electrode 800A connect to conductive legs 350 as shown in FIG. 6B.

Figure 6B:
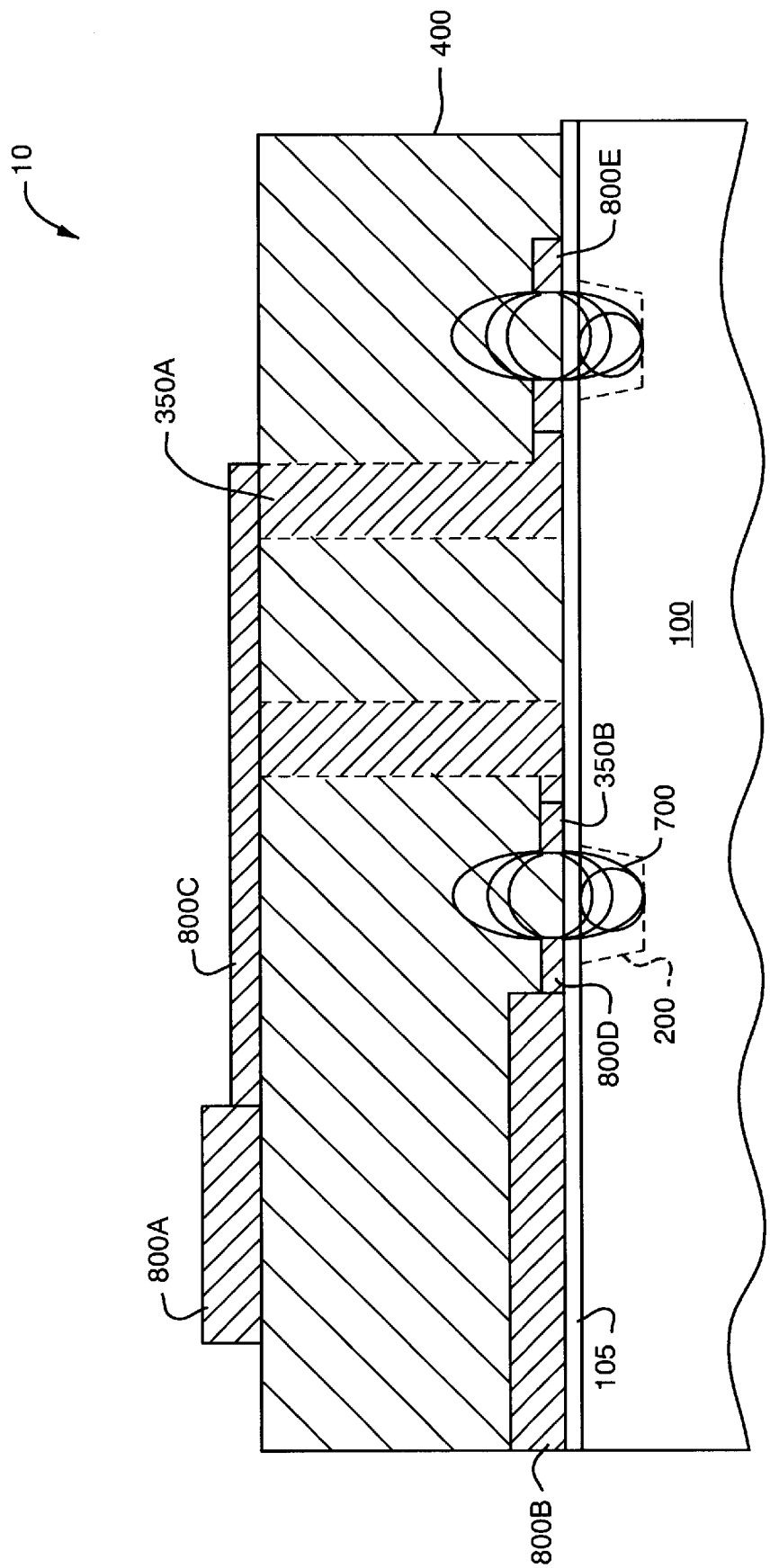
FIG. 6B is a cross-sectional view of the Mach-Zehnder interferometer having a microstrip transmission line and corresponding to FIG. 6A.

FIG. 6B is a cross-sectional view of the Mach-Zehnder interferometer having a microstrip transmission line corresponding to FIG. 6A. The conductive legs 350 extend from arms 800C of the signal electrode 800A to a surface of the substrate 100 toward the waveguide 200, through the buffer layer 400. The conductive legs 350 include a low reactance electrical conductor 350A and a loading electrode 350B.

The ground electrode 800B is disposed below the buffer layer 400 directly on the surface of the isolation buffer layer 105 or substrate 100 if isolation buffer layer is omitted. The ground electrode 800B is connected to loading electrodes 800D opposing a first set of loading electrodes 350B of the conductive legs 350 forming loading capacitors along a length of a first arm of the optical waveguide 200.

In addition, "L"-shaped arms 800E extend from the ground electrode 800B forming a second set of loading capacitors with a second set of loading electrodes 350B. The second set of loading capacitors are placed along a second arm of the waveguide 200.

Similar to previous embodiments, the conductive legs 350 in conjunction with opposing loading electrodes 800D and the "L"-shaped arms 800E from the ground electrode 800B create the loading capacitance for reducing the electrical velocity on the microstrip transmission line 800. Furthermore, they provide the electric field 700 for modulating the optical signals.

In more detail, this microstrip transmission line structure can be formed with the ground electrode 800B on the upper surface of the lithium niobate substrate 100 with the polyimide buffer layer 400 disposed 80 microns thick on top of the ground electrode 800B. The signal electrode 800A can be approximately a 150 micron wide strip on the upper surface of the polyimide buffer layer 400. This results in the unloaded microstrip transmission line 800 having an impedance of 57 ohms, a velocity of c/1.5, and a loss of only 0.8dB/cm at 32 GHz (both conductor and dielectric loss included).

Since the velocity of light in the waveguide 200 is c/2.15, 0.092 pF/mm of loading capacitance is added to match velocities. By placing loading capacitors every 0.4 mm, there will be very little dispersion as the spacing is well under a half wavelength at 32 GHz. There also will be very little loss due to the charging current flowing through the series resistance of the gold connections of the conductive legs 350. The loading capacitance will reduce the impedance to 40 ohms, which is close enough to 50 ohms that there will be very little mismatch problem at the launch from a 50 ohm source.

Figure 8:
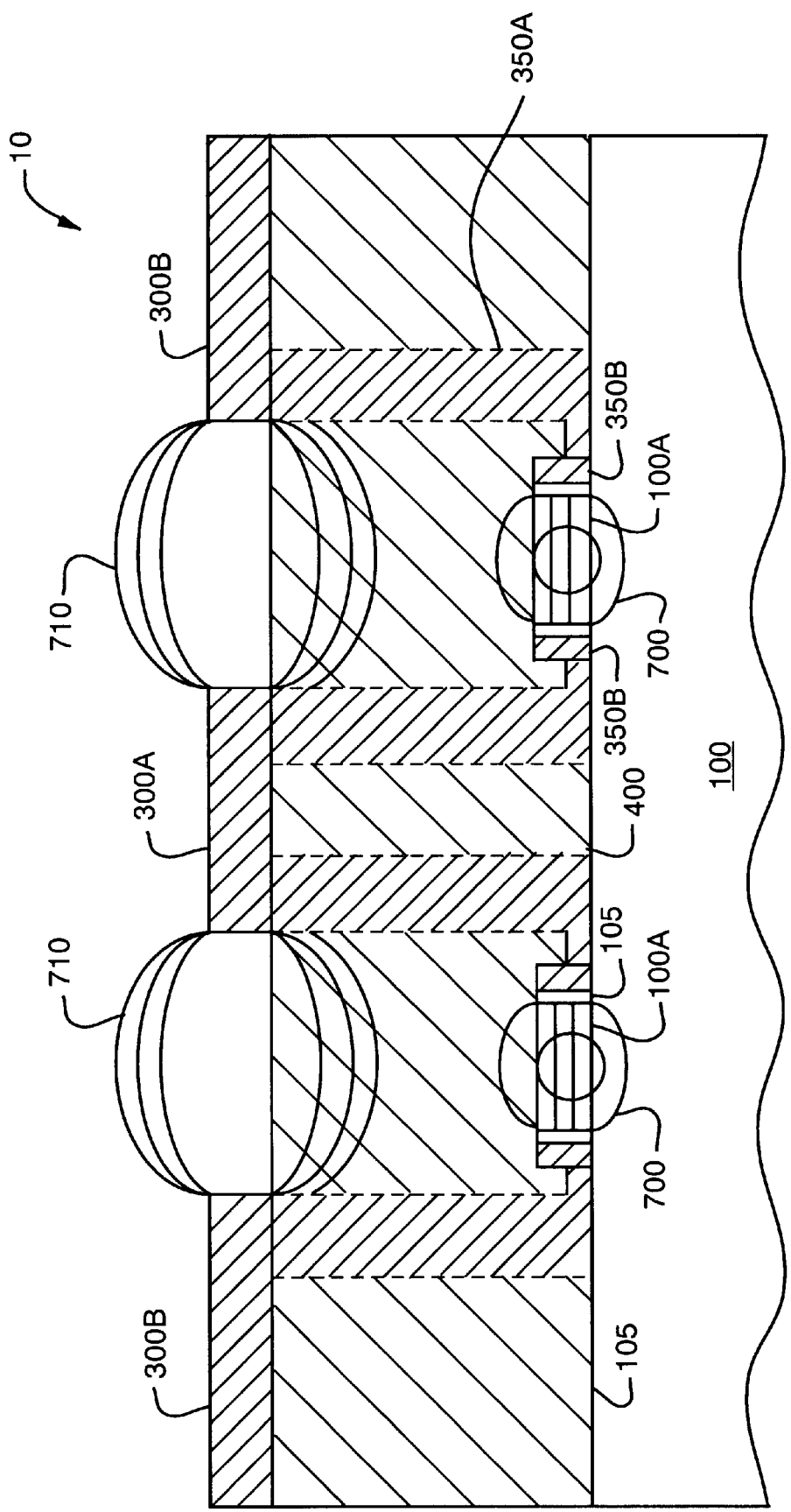
FIG. 8 is a cross-sectional view of the Mach-Zehnder interferometer having a ridged electro-optic substrate according to an alternative embodiment.

If the microstrip structure includes a ridge waveguide structure which is formed with a ridged portion 100A, as in FIG. 8, having a ridge width of approximately 10 microns adjacent to loading electrodes 350B having a width of approximately 20 microns each, the VL product is 40 V-mm at 1550 nanometers (nm) with a loading capacitance of 0.38 pF/mm when the electrodes 350B around both arms of the waveguide 200 are driven in parallel. Alternatively if the two sets of electrodes are driven in series, the VL product is 80 V-mm with a loading capacitance of 0.105 pF/mm. In this embodiment having a ridged substrate, it is more advantageous to drive the electrodes 350B around both arms of the waveguide 200 in series (not shown in FIG. 8), because the modulating electrodes can be placed along 88% of the length of the modulator to get 0.092 pF/mm of loading capacitance. Furthermore, if the modulator 10 is 50 mm long, the switching voltage is only 2.7V at 32 GHz, with a drop in response of only 2 dB from DC to 32 GHz. This represents a significant practical improvement over any known design using prior-art techniques. The numbers here were generated using a 2-D electrostatic field solver (brand name ELECTRO-2D) to numerically model the electrical fields in the waveguide, empirical loss and impedance formulae.

Figure 7A:
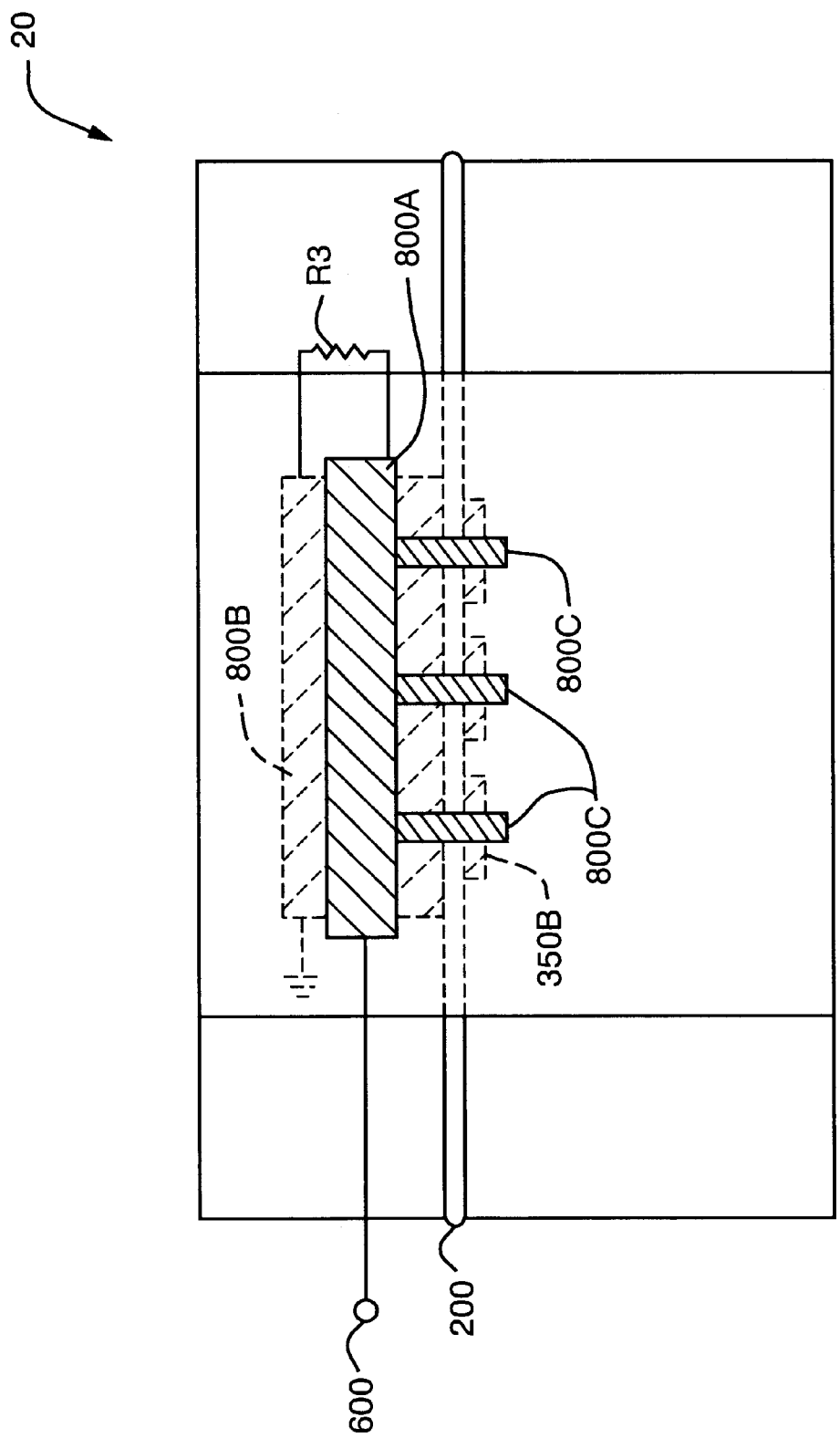
FIG. 7A is a top view of the electro-optic phase modulator according to an alternative embodiment.

FIG. 7A is a top view of the electro-optic phase modulator according to an alternative embodiment. This structure having its waveguide parameters slightly modified could also form a cutoff modulator. This structure is similar to FIG. 6A with the main exception being the pattern of the optical waveguide 200 defined in the substrate 100 and the corresponding modifications to the electrode structure. This structure modulates an optical signal generating a modulated optical signal having a phase shift which is detected by a wave detector at the receiving system.

According to this embodiment, the waveguide 200 is defined substantially straight, co-planar with the electro-optic substrate 100. Since the waveguide 200 does not diverge into multiple arms as with the Mach-Zehnder interferometer, only one set of conductive legs extend from the arms 800C of the signal electrode 800A as shown in FIG. 7B.

Figure 7B:
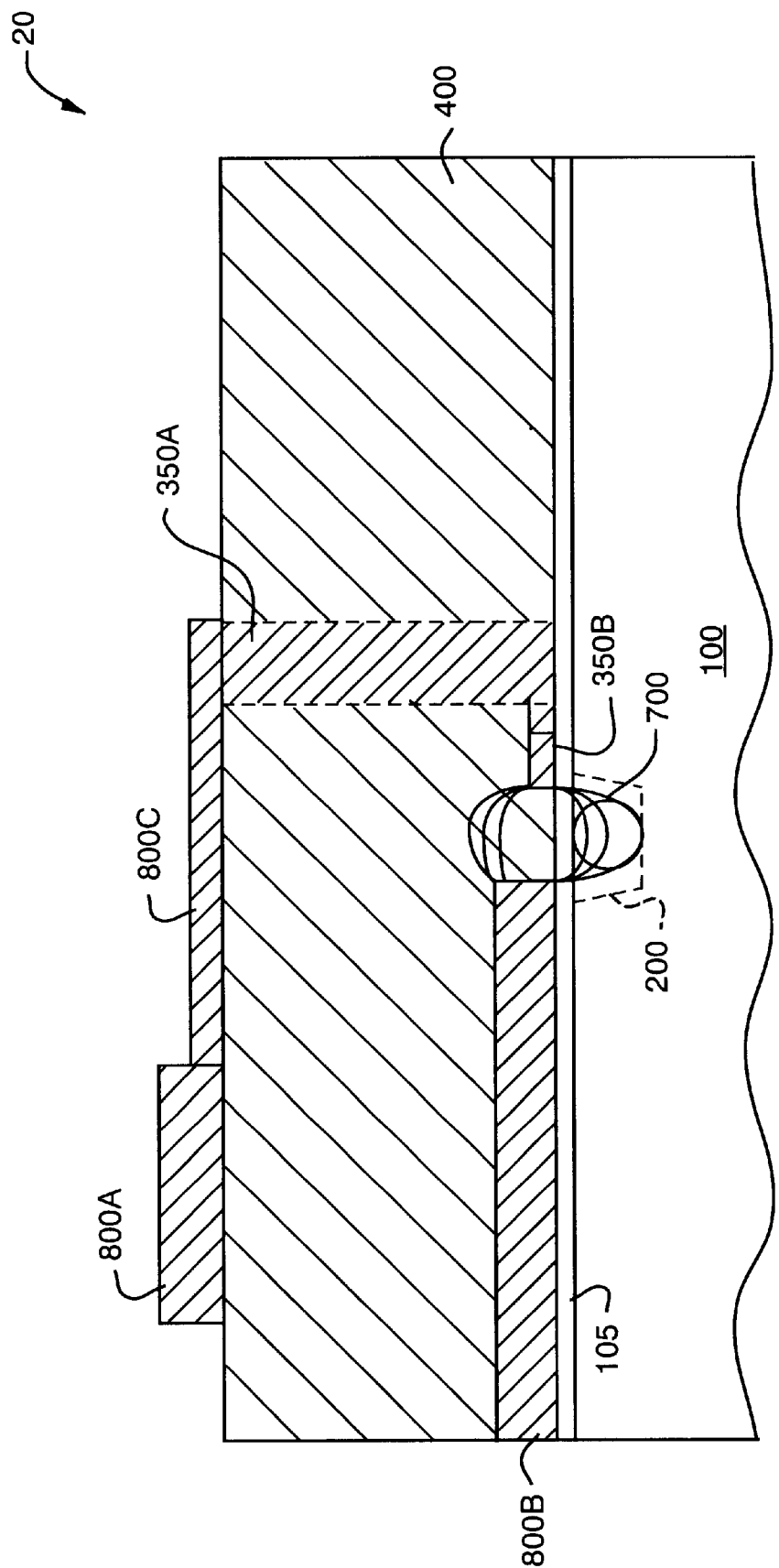
FIG. 7B is a cross-sectional view of a electro-optic phase modulator corresponding to FIG. 7A.

FIG. 7B is a cross-sectional view of a electro-optic phase modulator corresponding to FIG. 7A. The conductive legs 350 extend from arms 800C of the signal electrode 800A to a surface of the substrate 100 toward the waveguide 200, through the buffer layer 400. The loading electrodes 350B of the conductive legs 350 oppose the ground electrode 800B forming loading capacitors that function in the same manner as in previous embodiments. Although there are no loading electrodes connected to the ground electrode 800B, the segmented center electrode formed by conductive legs 350 and signal electrode 800A ensures that the microwave power flows only on the microstrip transmission line 800. The electric field 700 for modulating the optical signal is applied across the gap between the conductive legs 350 and the ground electrode 800B.

Figure 9:
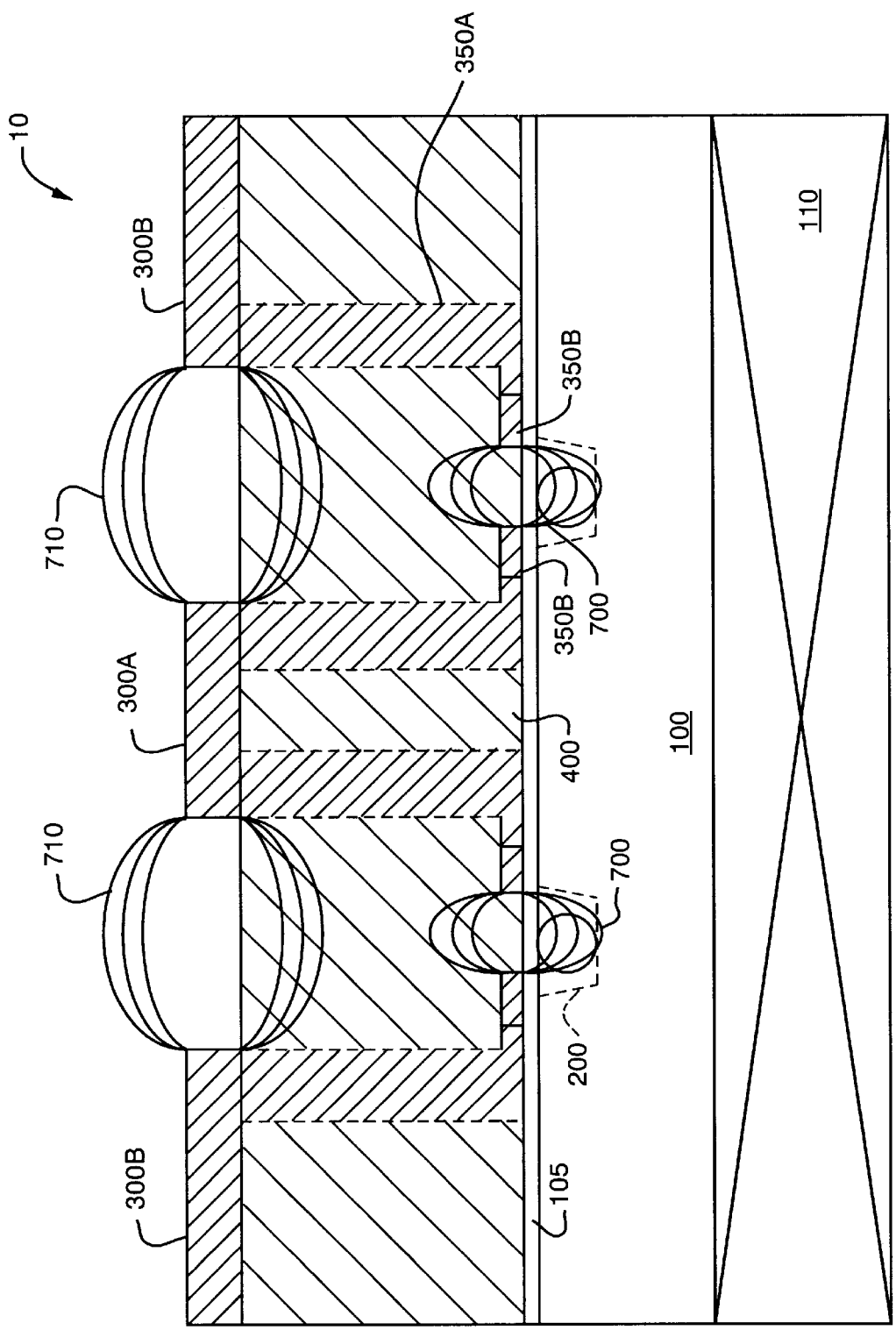
FIG. 9 is a cross-sectional view of the Mach Zehnder interferometer having a thin electro-optic substrate layer according to an alternative embodiment.
Figure 10:
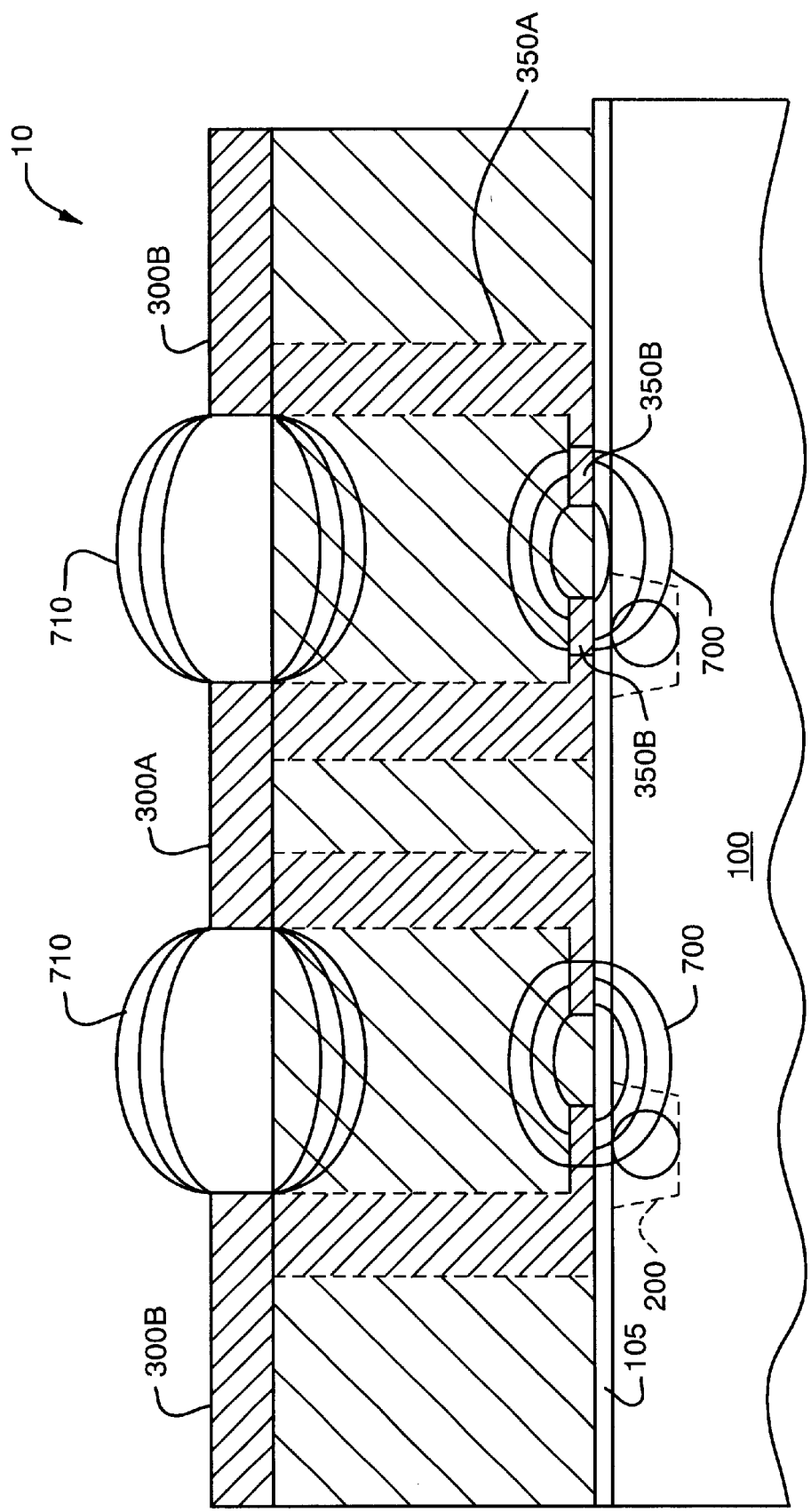
FIG. 10 is a cross-sectional view of the Mach Zehnder interferometer having a waveguide alignment according to an alternative embodiment.

FIGS. 8, 9, and 10 illustrate alternative substrate structures that can be used in accordance with the principles of the present invention.

FIG. 8 is a cross-sectional view of the Mach-Zehnder interferometer having a ridged electro-optic substrate according to an alternative embodiment. This substrate structure increases the electric field 700 across the waveguide 200 at a given voltage. The surface of the electro-optic substrate 100 is modified such that it is not planar. A ridged portion 100A is created by a portion of the substrate 100 including the optical waveguide 200 being raised up from the base surface of the substrate 100. The loading electrodes 350B of the conductive legs 350 are modified such that a portion of the electrode 350B extends along the vertical component of the ridged portion 100A of the electro-optic substrate 100. An isolation buffer layer 105 may separate the loading electrodes 350B from the ridged portion 100A of the electro-optic substrate 100. The electrode and buffer layer structure disposed above this alternative substrate structure may be similar to those described and shown in previous embodiments.

FIG. 9 is a cross-sectional view of the Mach Zehnder interferometer having a thin electro-optic substrate layer according to an alternative embodiment. FIG. 9 is similar to FIG. 3 with the exception that the electro-optic substrate 100 is a thin layer disposed over a different substrate material 110 having a lower dielectric constant at electrical frequencies. The electrode and buffer layer structure disposed above this alternative substrate structure may be similar to those described and shown in previous embodiments.

FIG. 10 is a cross-sectional view of the Mach Zehnder interferometer having an waveguide alignment according to an alternative embodiment. FIG. 10 is similar to FIG. 3 with the exception that the optical waveguide 200 is aligned such that the optical signal is modulated by the vertical component of the electric field for modulation 700 rather than the horizontal component. According to this embodiment, the waveguide 200 is positioned directly beneath the loading electrodes 350B. The vertical component of the electric field 700 is typically used when the electro-optic substrate 100 is z-cut lithium niobate. The electrode and buffer layer structure disposed above this alternative waveguide alignment may be similar to those described and shown in previous embodiments.

While this invention has been particularly shown and described with references to preferred embodiments thereof, it will be understood by those skilled in the art that various changes in form and details may be made therein without departing from the scope of the invention encompassed by the appended claims.

What is claimed is:

1. An electro-optic modulator comprising:
   an electro-optic substrate;
   at least one optical waveguide defined within the substrate having an optical signal propagating at an optical velocity;
   an electrode structure having a transmission line and conductive legs, the conductive legs extending the transmission line from the substrate; and
   an electrical signal propagating at an electrical velocity along the transmission line.

2. The electro-optic modulator of claim 1 further comprising a dielectric layer disposed between the substrate and the transmission line, the dielectric layer having a dielectric constant lower than the substrate.

3. The electro-optic modulator of claim 2 wherein the dielectric layer is polyimide.

4. The electro-optic modulator of claim 1 wherein the conductive legs extend the transmission line a distance from a surface of the substrate substantially reducing the strength of an electric field, associated with the electrical signal propagating in the transmission line, in the substrate to maximize the electrical velocity of the electrical signal propagating on the transmission line.

5. The electro-optic modulator of claim 4 wherein the electric field associated with the electrical signal propagating in the transmission line substantially travels within a region having a dielectric constant lower than a dielectric constant of the substrate.

6. The electro-optic modulator of claim 5 wherein the region having a low dielectric constant is air.

7. The electro-optic modulator of claim 5 wherein the region having a low dielectric constant is a dielectric layer.

8. The electro-optic modulator of claim 1 wherein the conductive legs provide a capacitance reducing the electrical velocity to match the optical velocity of the optical signal propagating in the waveguide.

9. The electro-optic modulator of claim 1 wherein a first set of conductive legs oppose a second set of conductive legs along a length of the optical waveguide generating an electric field across the waveguide modulating the optical signal.

10. The electro-optic modulator of claim 9 wherein the conductive legs are spaced apart from one another.

11. The electro-optic modulator of claim 1 wherein the conductive legs comprise a low reactance electrical conductor and a loading electrode.

12. The electro-optic modulator of claim 11 wherein opposing loading electrodes of opposing conductive legs are disposed along a length of the optical waveguide, the opposing loading electrodes generating an electric field across the waveguide modulating the optical signal.

13. The electro-optic modulator of claim 12 wherein the opposing loading electrodes of the opposing conductive legs generate a capacitance that reduces the electrical velocity on the transmission line to match the optical velocity of the optical signal.

14. The electro-optic modulator of claim 12 wherein the optical waveguide is aligned between opposing loading electrodes of the conductive legs, the optical signal being modulated by a horizontal component of the electric field.

15. The electro-optic modulator of claim 12 wherein the optical waveguide is aligned adjacent to the loading electrodes, the optical signal being modulated by a vertical component of the electric field.

16. The electro-optic modulator of claim 1 wherein the electro-optic substrate is a thin layer disposed over a second substrate having a lower dielectric constant at electrical frequencies.

17. The electro-optic modulator of claim 1 wherein the electro-optic substrate is non-planar, the optical waveguide being ridged.

18. The electro-optic modulator of claim 1 wherein the electro-optic substrate is a ferroelectric material.

19. The electro-optic modulator of claim 18 wherein the ferroelectric material is lithium niobate.

20. The electro-optic modulator of claim 1 wherein the electro-optic substrate is a III–V semiconductor.

21. The electro-optic modulator of claim 1 further comprising an isolation buffer layer, the isolation buffer layer disposed immediately over the electro-optic substrtate.

22. The electro-optic modulator of claim 1 is a Mach-Zehnder interferometer.

23. The electro-optic modulator of claim 1 is a phase modulator.

24. An electro-optic modulator of claim 1
   wherein the transmission line can support an electrical signal propagating at an electrical velocity along the transmission line substantially matching the optical velocity.

25. An electro-optic modulator comprising:

an electro-optic substrate;

at least one optical waveguide defined within the substrate having an optical signal propagating at an optical velocity;

an electrode structure having a transmission line and conductive legs, the conductive legs extending the transmission line from the substrate, the transmission line having a signal electrode and at least one ground electrode;

an electrical signal propagating at an electrical velocity along the transmission line, the electrical velocity substantially matching the optical velocity; and a dielectric layer disposed adjacent the signal electrode and the ground electrode, the dielectric layer having a dielectric constant lower than the substrate.

26. An electro-optic modulator comprising:

an electro-optic substrate;

at least one optical waveguide defined within the substrate having an optical signal propagating at an optical velocity;

an electrode structure having a transmission line and conductive legs, the transmission line having a signal electrode and at least one ground electrode, the conductive legs extending the signal electrode from the substrate, the ground electrode being disposed directly over a surface of the substrate;

an electrical signal propagating at an electrical velocity along the transmission line, the electrical velocity substantially matching the optical velocity; and a dielectric layer disposed adjacent the signal electrode, the dielectric layer having a dielectric constant lower than the substrate.

27. An electro-optic modulator comprising:

an electro-optic substrate;

at least one optical waveguide defined within the substrate having an optical signal propagating at an optical velocity;

an electrode structure having an microstrip transmission line and conductive legs, the microstrip transmission line having a signal electrode and a ground electrode, the signal electrode having arms extending substantially perpendicular from the signal electrode, the conductive legs extending from the arms of the signal electrode to a surface of the substrate toward the waveguide, the ground electrode being disposed directly over a surface of the substrate; and an electrical signal propagating at an electrical velocity along the transmission line, the electrical velocity substantially matching the optical velocity.

28. The electro-optic modulator of claim 27 further comprising a dielectric layer disposed between the signal electrode and the ground electrode, the conductive legs extending from the arms of the signal electrode to the surface of the substrate through the dielectric layer toward the waveguide, the dielectric layer having a dielectric constant lower than the substrate.

* * * * *